(12) United States Patent
Valinejadshoubi et al.

(10) Patent No.: US 9,790,687 B1
(45) Date of Patent: Oct. 17, 2017

(54) ROOF SYSTEM WITH ENERGY EFFICIENT FEATURES

(71) Applicants: Masoud Valinejadshoubi, Mazandaran (IR); Mannan Ghanizadehgrayli, Mazandaran (IR); Mojtaba Valinejadshoubi, Mazandaran (IR)

(72) Inventors: Masoud Valinejadshoubi, Mazandaran (IR); Mannan Ghanizadehgrayli, Mazandaran (IR); Mojtaba Valinejadshoubi, Mazandaran (IR)

(*) Notice: Subject to any disclaimer, the term of this patent is extended or adjusted under 35 U.S.C. 154(b) by 0 days.

(21) Appl. No.: 15/130,158

(22) Filed: Apr. 15, 2016

(51) Int. Cl.
| | |
|---|---|
| *E04D 13/00* | (2006.01) |
| *E04F 17/00* | (2006.01) |
| *A01G 1/00* | (2006.01) |
| *H02S 20/23* | (2014.01) |
| *E04D 13/04* | (2006.01) |
| *E04C 2/52* | (2006.01) |
| *E04D 11/00* | (2006.01) |
| *F03D 9/00* | (2016.01) |
| *H02K 7/18* | (2006.01) |
| *F01D 15/10* | (2006.01) |

(52) U.S. Cl.
CPC .............. *E04D 13/00* (2013.01); *A01G 1/005* (2013.01); *A01G 1/007* (2013.01); *E04C 2/525* (2013.01); *E04D 11/002* (2013.01); *E04D 13/04* (2013.01); *E04F 17/00* (2013.01); *F01D 15/10* (2013.01); *F03D 9/002* (2013.01); *H02K 7/183* (2013.01); *H02K 7/1823* (2013.01); *H02S 20/23* (2014.12); *F05B 2220/32* (2013.01)

(58) Field of Classification Search
CPC ......... E04D 3/04; E04D 13/00; E04D 11/002; E04D 1/24; E04D 1/04; E04D 1/30; E04D 13/04; E04C 2/525; H02K 7/183; H02K 7/1823; H02S 20/23; A01G 1/005; A01G 1/007; A01G 9/14; A01G 9/1476; A01G 9/26; F01D 15/10; F03D 9/002; F05B 2220/32; E04F 17/00
USPC .... 52/302.1, 302.3, 302.7, 94, 95, 198, 199, 52/173.1, 173.3; 47/18, 46, 65.9, 17, 47/1.01 R, 22.1
See application file for complete search history.

(56) References Cited

U.S. PATENT DOCUMENTS 4,800,675 A * 1/1989 Feil ........................... E04D 1/30
47/33
7,596,906 B2 10/2009 Gold
(Continued)

FOREIGN PATENT DOCUMENTS

DE 4413258 A1 * 10/1995 ........... E04D 11/002

OTHER PUBLICATIONS

Machine translation of Foreign reference DE4413258, obtained from https://patentscope.wipo.int/search/en/detail. jsf?docId=DE103004585&recNum=1&maxRec=&office= &prevFilter=&sortOption=& queryString=&tab=PCTDescription (last accessed on Feb. 17, 2017).*

(Continued)

*Primary Examiner* — Theodore Adamos
(74) *Attorney, Agent, or Firm* — NovoTechIP International PLLC

(57) ABSTRACT

A roof system that includes a roof covering in the form of planting areas, a water storage, a wind turbine, a water turbine, a solar panel, and a water heater. The roof system includes a plurality of ceramic chambers each including a wind turbine and a recess for housing a planter area.

20 Claims, 17 Drawing Sheets

(56) References Cited

U.S. PATENT DOCUMENTS

| | | | |
|---|---|---|---|
| 8,479,443 B2 | 7/2013 | Buist | |
| 2005/0120656 A1 | 6/2005 | Luckett | |
| 2006/0070299 A1* | 4/2006 | Furumura | A01G 9/02 47/69 |
| 2006/0242901 A1* | 11/2006 | Casimaty | A63C 19/00 47/65.9 |
| 2008/0098674 A1* | 5/2008 | Daniels | E04D 1/045 52/199 |
| 2008/0113612 A1* | 5/2008 | Chich | F24F 7/025 454/341 |
| 2008/0236041 A1* | 10/2008 | Carpenter | E04D 11/002 47/65.9 |
| 2010/0060011 A1* | 3/2010 | Kiler | F03D 9/002 290/55 |
| 2011/0140443 A1* | 6/2011 | Morrison | F03D 9/002 290/55 |
| 2011/0209421 A1* | 9/2011 | Arguelles | E04D 1/045 52/173.3 |
| 2011/0215586 A1* | 9/2011 | Grace | E04H 9/14 290/55 |
| 2011/0316284 A1* | 12/2011 | Tabatabaian | F03D 1/04 290/55 |
| 2012/0175879 A1* | 7/2012 | Keech | F03D 3/002 290/44 |
| 2013/0055673 A1* | 3/2013 | Meuser | E04D 1/30 52/745.06 |
| 2013/0217318 A1* | 8/2013 | Edwards | E04D 1/24 454/366 |
| 2013/0298463 A1* | 11/2013 | Ke | A01G 9/02 47/79 |
| 2014/0308120 A1* | 10/2014 | Komp | F03D 1/04 415/218.1 |
| 2015/0121779 A1* | 5/2015 | Arguelles | E04D 11/002 52/173.1 |
| 2016/0135381 A1* | 5/2016 | Garner | A01G 1/005 47/65.9 |

OTHER PUBLICATIONS

Masoud Valinejadshoubi, "Environmental roof with collection and refinement characteristics of rainwater," English Translation of IR Patent 81405 (Dec. 14, 2013).

* cited by examiner

SECTION I

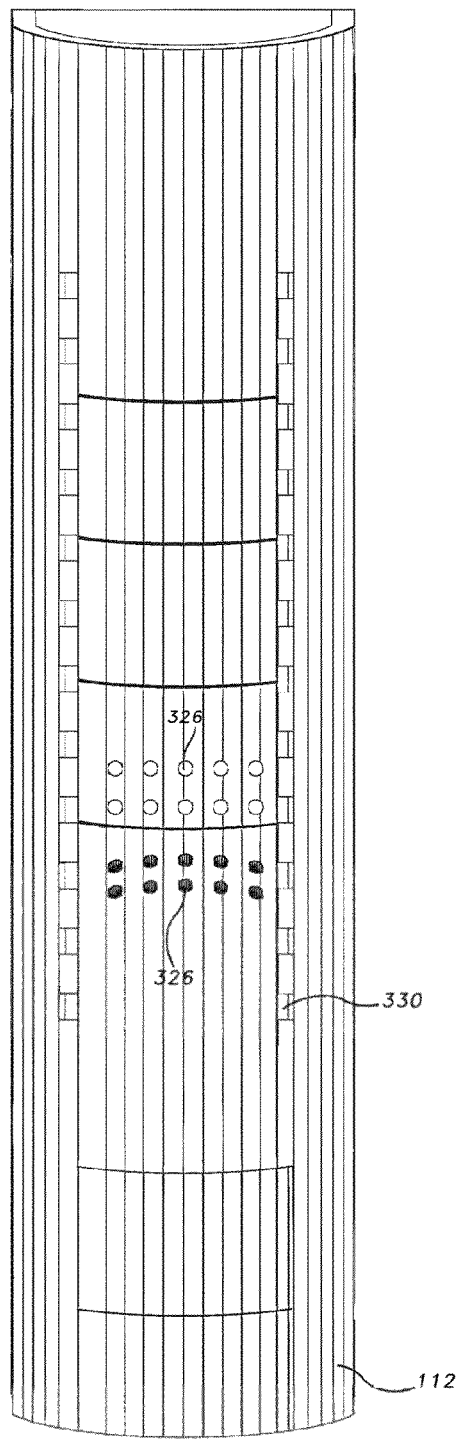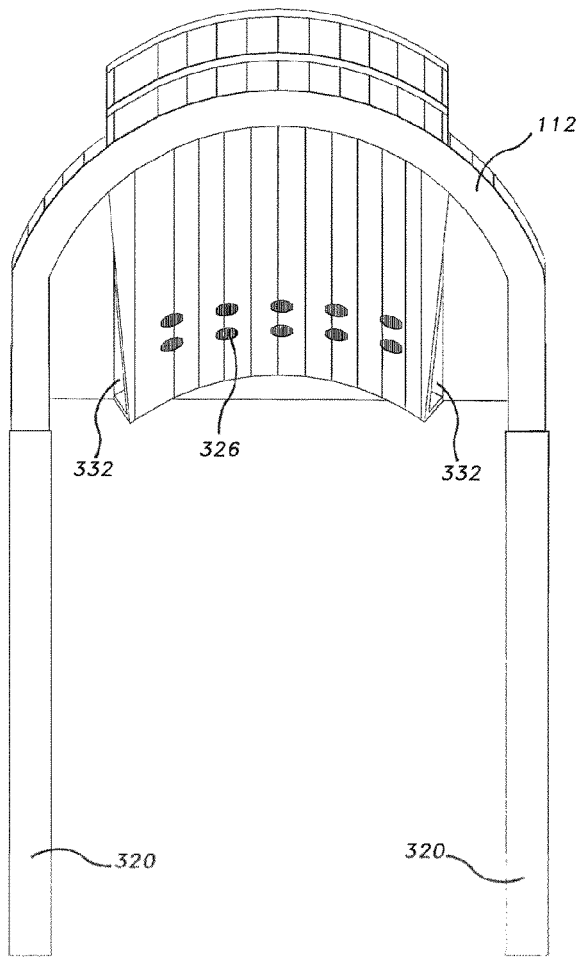
FIG.3G
FIG.3F

ROOF SYSTEM WITH ENERGY EFFICIENT FEATURES

BACKGROUND

Some roof systems provide vegetation growth on a roof of a building or other structure, which roof systems may be referred to as green roof systems. Typical green roof systems include a waterproof membrane applied to the surface of the roof, a layer of soil or other growing medium provided on top of the membrane, and vegetation provided in the soil. The green roof systems may result in lower energy costs for the building, improved roof appearance, noise reduction and increased roof life, and reduction in building's temperature.

Some green roof systems can be used for filtering rain water. The rain water passes through the vegetation of the green roof system and enters a storage area. The water that has passed through the vegetation may not be potable, but may considered as "gray water" to be utilized for non-drinking activities such as for example, shower, toilets, and other cleaning type activities. However, such green roof systems may require a large area for installation and therefore may be difficult to install on buildings that have a limited space. Furthermore, such green roof system may not be configured to take advantage of various natural resources to generate electricity, provide drinking water, and/or provide clean air for the building.

Hence, there is a need for an improved roof system that can be configured to generate electricity, drinking water, and/or provide clean air for the building.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIGS. 3A-3G illustrate various views of an exemplary central section module of the roof system shown in FIG. 1A;

DETAILED DESCRIPTION

Figure 1A:
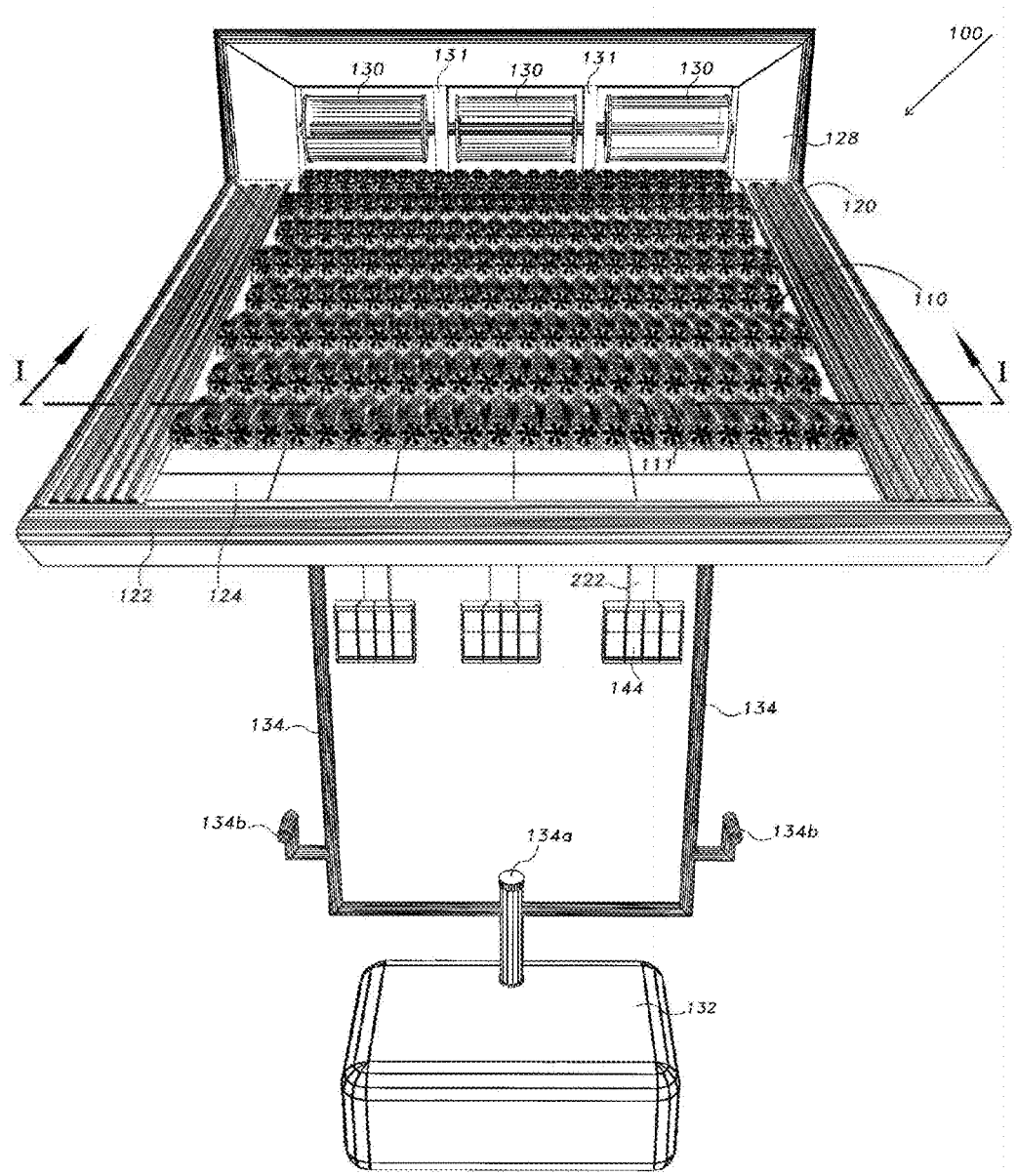
FIGS. 1A-1E illustrate various views an exemplary roof system.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

In some implementations, the instant application describes a roof system that includes a roof covering in the form of planting areas, a water storage, a wind turbine, a water turbine, a solar panel, and a water heater. The roof includes a plurality of ceramic chambers each including a recess for housing a planter area. The planter areas may be used to reduce carbon dioxide. The water storage is configured to store the rain water.

The rain water may be stored in two ways—direct and indirect. The indirect storage may refer to storage of water that passes through the planters and enters a storage area. The direct storage may refer to storage of water that directly enters the storage area. In either case, the stored water may have both drinking usage and non-drinking usage. For the non-drinking usage, the water may not have to be further processed. For the drinking usage, however, the water may be further processed. The processing may be done via a filter that is placed inside, or in a path to, the water storage.

The wind turbines, the water turbine, and the solar panel may be used to generate electricity for the building. The generated electricity may be used for various purposes such as, for example, heating the building or activating appliances, and/or may be sent to a main power grid. The appliances may include items such as, for example, lighting, a refrigerator, a washer and dryer, a microwave, a stove and/or other items that depend on electricity to function.

The wind turbines may include two types—a smaller type and a larger type. Both types may be used to generate electricity. The larger wind turbines may be placed on an elevated peripheral portion of the roof system. The smaller wind turbines may be placed within each of the plurality of ceramic chambers. In addition to being used to generate electricity from wind, the wind turbines may be used to generate clean air for the building. The plurality of ceramic chambers, located on a central portion of the roof system, may be designed to attract wind to their respective interior housings. The wind from the interior housing of the ceramic chambers enters their respective channels beneath the chambers. The channels may be connected to air ventilation inside the building and may provide clean air for the building. The air ventilation may include a fan and a heating element. The fan may be used to further assist in pushing the clean air into the different units within the building to cool the units. The heating element may be placed after the fan and may be used to heat the cleaned air and before entering the units. The wind passing thorough the smaller type and the larger type turbines will result in their rotation, which in turn results in generation of electricity.

The water turbine may be placed in the pathway of the water to the water storage. As the water is transferred from the roof to the water storage, the water may pass through the turbine, turning the turbine and generating electricity. The water heater may be a solar water heater and may be used to heat the water and provide hot water for the building. The hot water may be used for showering or washing dishes. The solar panel may be used to turn the solar energy to electricity for hot water and/or a solar panel may be used to heat the water. For example, in the absence of the sun, the generated electricity may be used to heat the water.

Figure 1B:
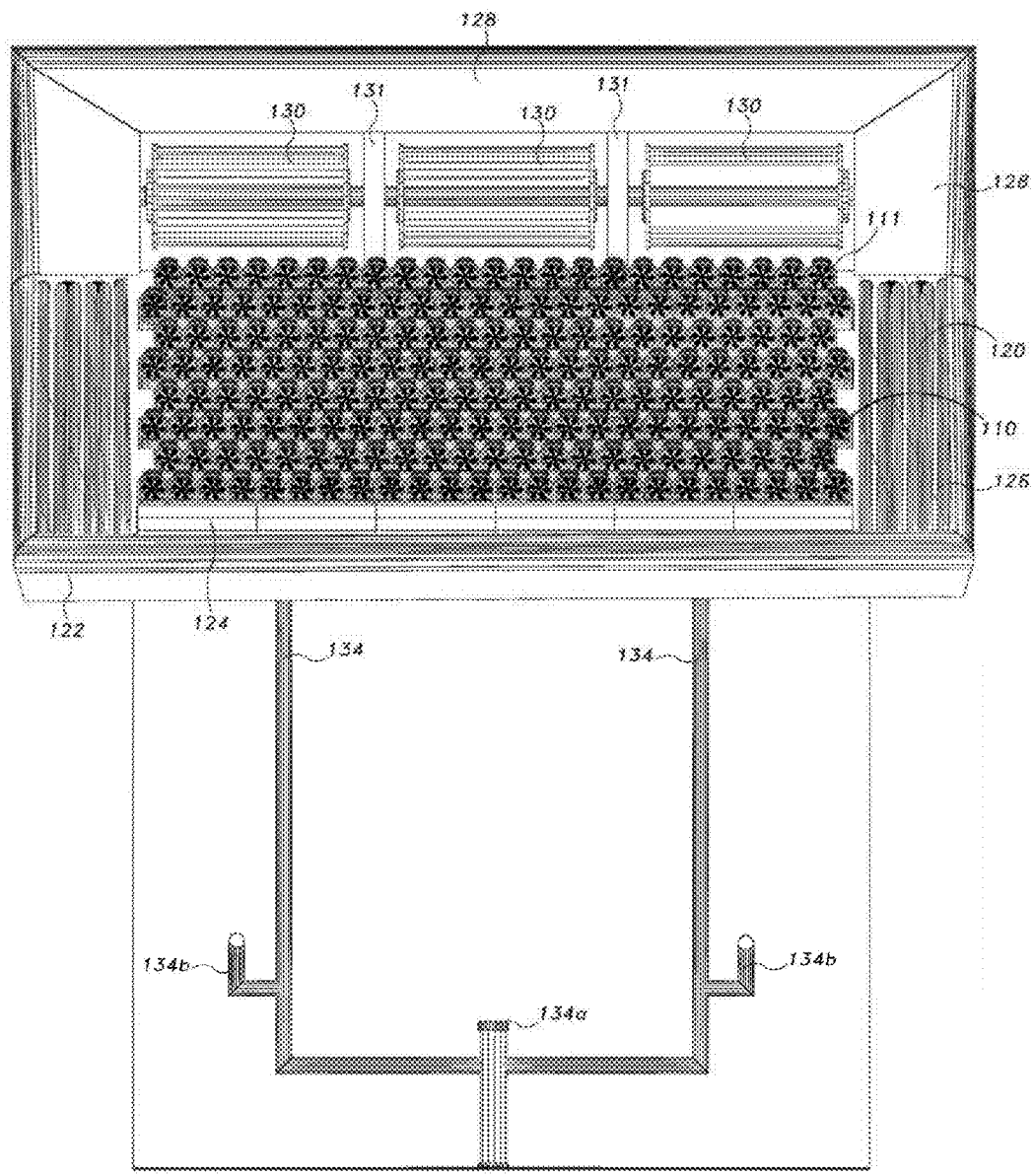
Figure 1C:
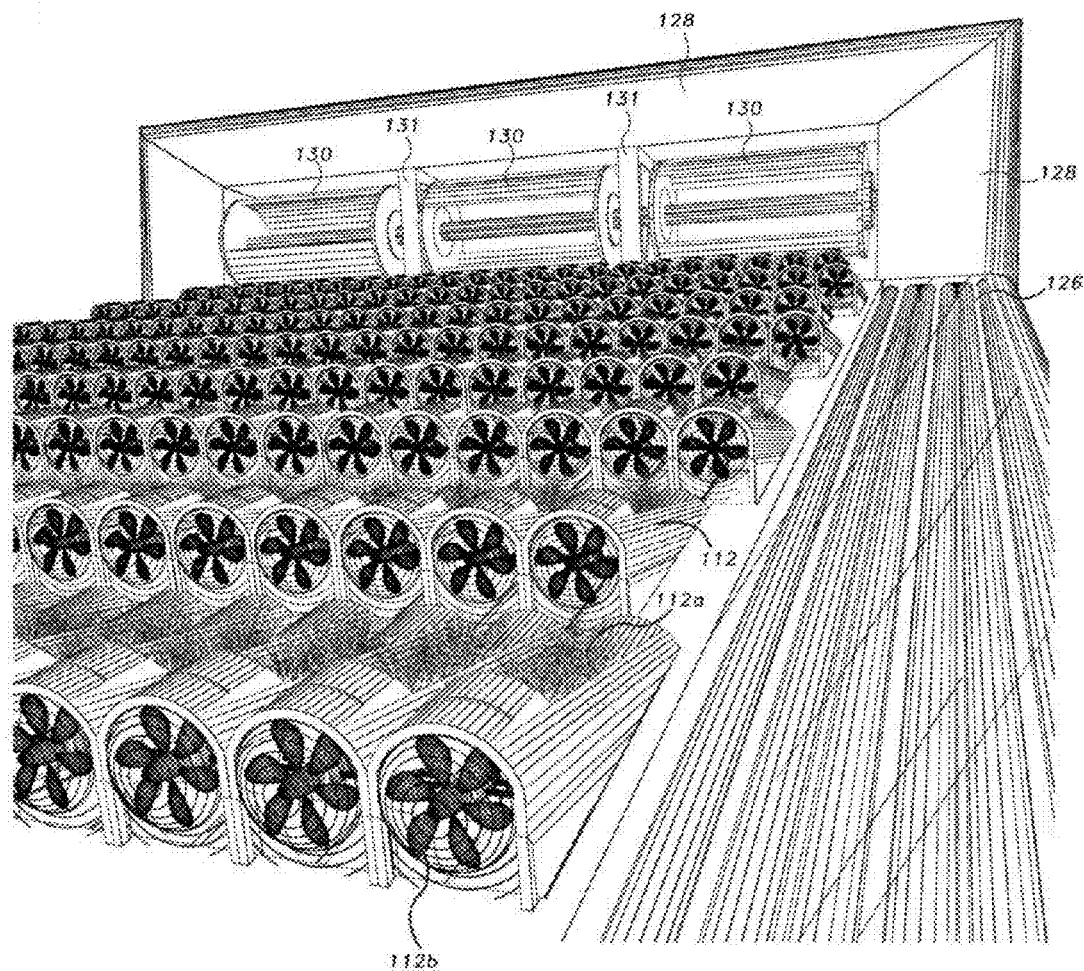
Figure 1D:
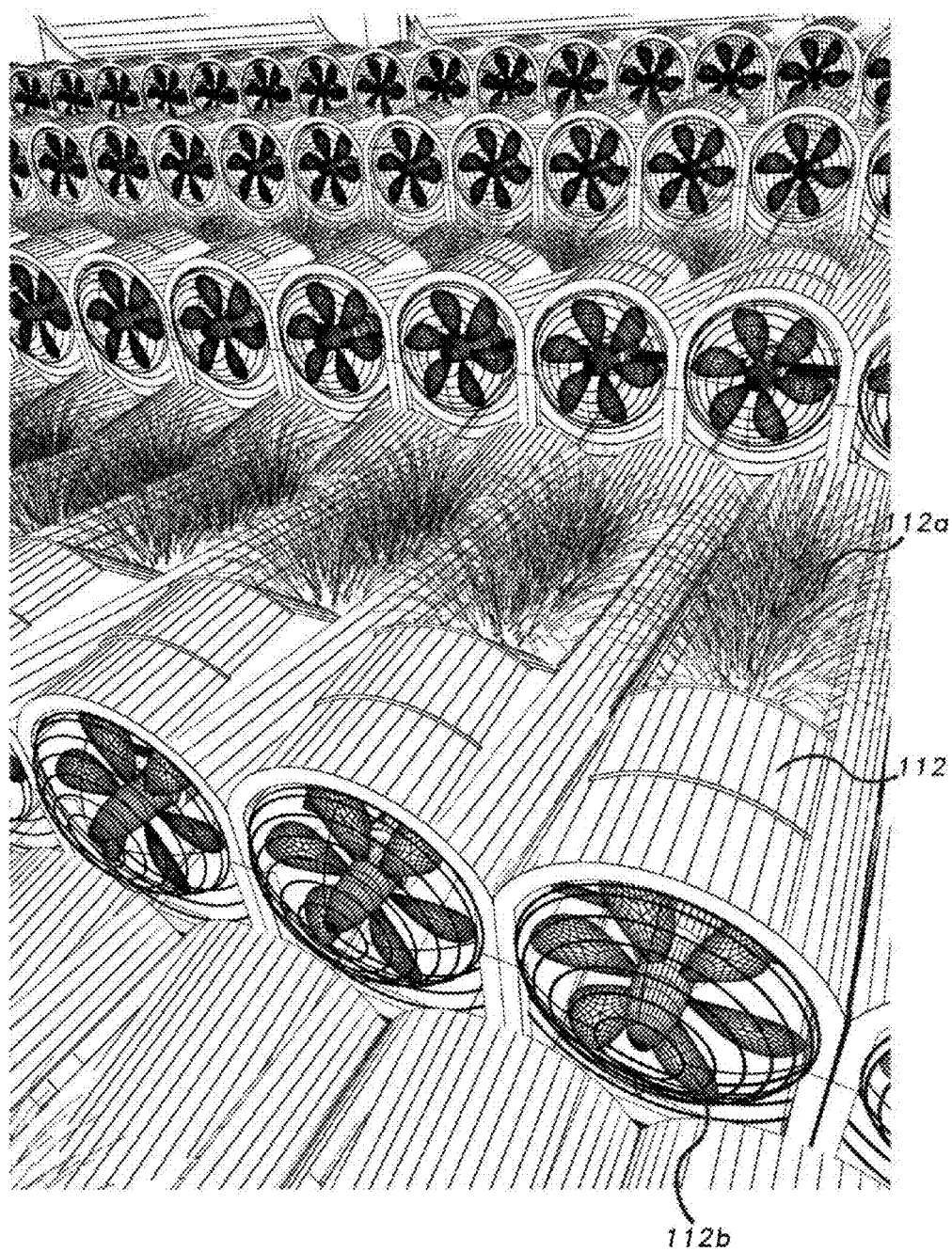
Figure 1E:
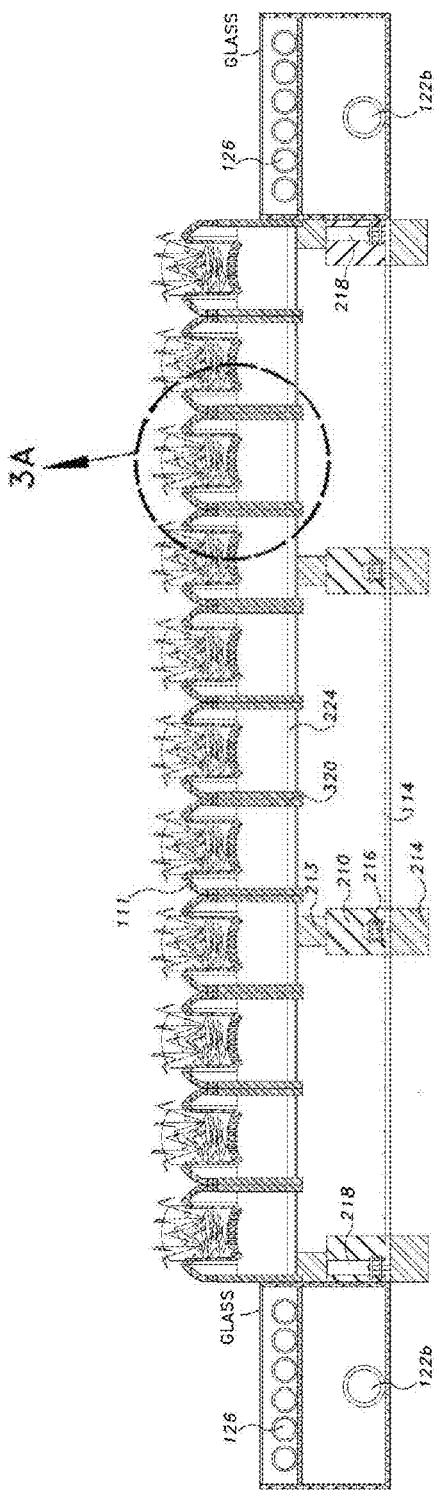

With this overview, reference now is made in detail to the examples illustrated in the accompanying drawings and discussed below. FIG. 1A-1E illustrate an exemplary roof system 100 from various view angles. FIG. 1A is a front perspective view of a roof system according to some implementations. FIG. 1B is a front elevation view of the roof system. FIG. 1C is a perspective view of the roof system. FIG. 1D is a close-up partial perspective view of the roof system. FIG. 1E is a schematic cross sectional view of the roof system.

The roof system 100 includes a central portion 110, which may occupy a majority area of the roof, and a peripheral portion 120. The central portion 110 includes a plurality of central portion modules 111, each including respective ceramic chambers 112. The ceramic chambers 112 are arranged in multiple rows and are mounted to cover the central portion 110 of the roof. The ceramic chambers 112 are used to filter the rain water, generate electricity, and filter air for the interior of the building. To this end, each ceramic chamber 112 is designed to house a planter area 112a on top of the ceramic chamber 112 and a small wind turbine 112b inside the ceramic chamber 112, and the combination of a ceramic chamber 112, and an associated planter area 112a and turbine 112b forms a respective central portion module 111.

The planter area 112a is used for filtering rain water. The rain water falling on the planter area 112a comes into contact with the planter area 112a. The planter area 112a cleans the rain water before passing the rain water to a tray 114 (shown in FIG. 2B). The tray 114 may be a distributed tray placed under the plurality of ceramic chambers 112 and may be configured to transfer the water to a preliminary storage area 122 described below, and located within the peripheral portion 120 of the roof system 100.

The ceramic chambers 112 are designed to attract the wind to their interior cavity. The wind attracted to the interior cavity of the ceramic chambers 112 passes through the planter area 112a of an adjacent ceramic chamber 112 and is thereby filtered before entering a common channel located under the plurality of ceramic chambers 112 and above the tray 114. The wind turbine 112b may be placed on the pathway of the wind entering the ceramic chambers 112. The wind turbine 112b may be configured to turn the wind energy to electricity. The wind turbine 112b may also be configured to further guide the wind inside the common channel placed under the plurality of ceramic chambers 112. The common channel may lead to a tunnel connected to the air ventilation of the building. To this end, clean air may be transferred from the common channel to the interior of the building.

As noted above, the roof system 100 also includes a peripheral portion 120. The peripheral portion 120 surrounds the central portion 110 and includes a preliminary water storage 122, a solar panel 124, a solar water heater 126, a heated water storage 128, and a set of three wind turbines 130. The preliminary water storage 122 may be placed in the front portion of the peripheral portion 120 and is connected to the tray 114 located under the plurality of chambers 112. The preliminary water storage 122 forms a lower end portion of the peripheral section 120 and is positioned near a lower front portion of the tray 114.

The large turbines 130 are located on a forehead portion 131 of the peripheral section 120. The large turbines 130 may be configured to generate electricity from the wind energy. The preliminary water storage 122 also includes an electric-producing solar panel 124 placed on top of the preliminary water storage 122. The solar panel 124 is configured to convert solar energy to electricity, and may be, for example, a photovoltaic cell type. The electricity generated via the solar panel 124, the wind turbines 126a and 130, and a water turbine (discussed below and shown in FIG. 6) may be used to generate power for the building.

Figure 2A:
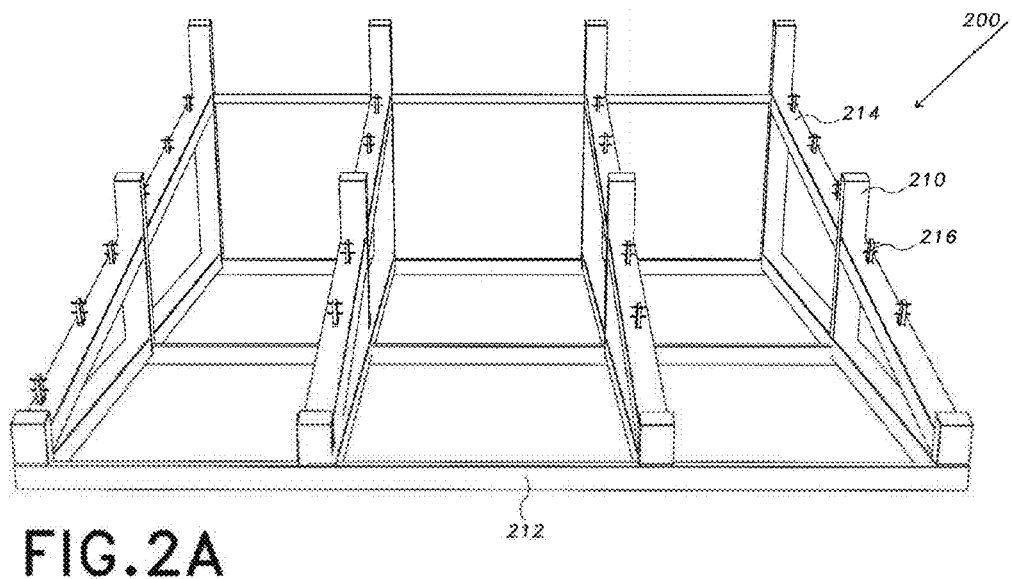
FIGS. 2A-2B illustrate two construction phases of the exemplary roof system shown in FIG. 1A.
Figure 2B:
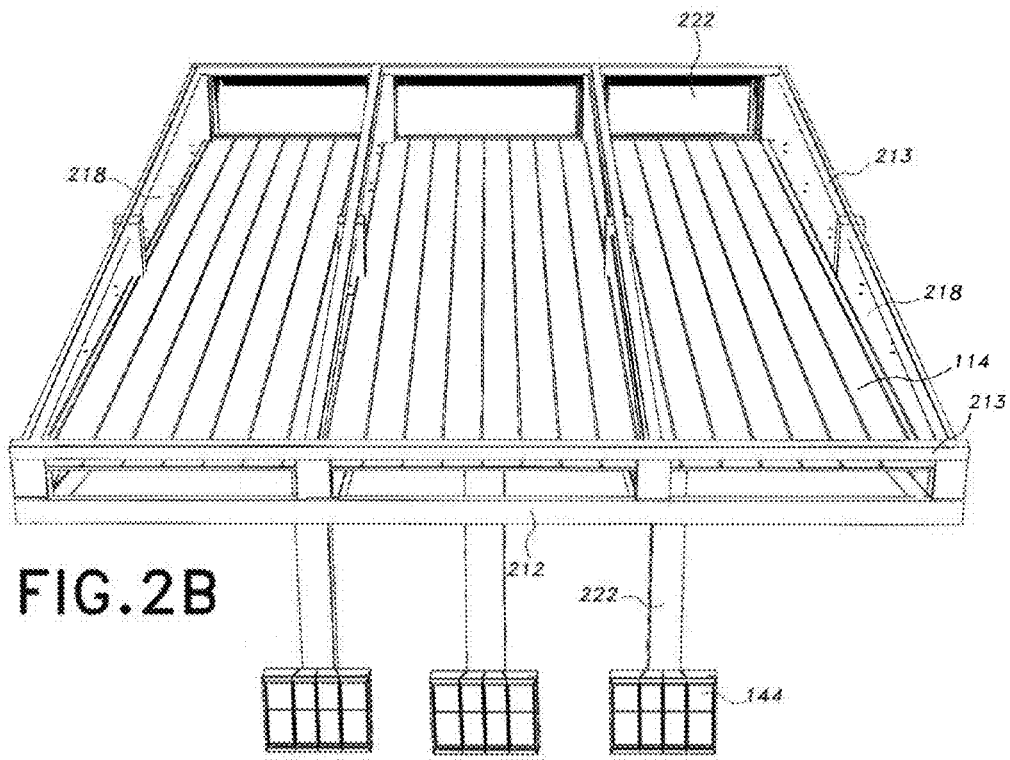

FIGS. 2A-2B illustrate two construction phases of the exemplary roof system 100 shown in FIG. 1A. FIG. 2A is a front perspective view of the roof system 100 in a first phase of construction. A frame 200 is constructed having vertical posts 210, horizontal bars 212 and angled rails 214. FIG. 2B is a front perspective view of the roof system 100 in a second phase of construction, in which mounting pins 216 project upwards from the angled rails 214. The tray 114 may be placed on the mounting pins 216. In phase two, a back panel 222, vertical side walls 218, and horizontal mounting rails 224 (shown in FIG. 3C) may also be installed. The back panel 222 may include a plurality of channels for channeling the air from the tray 114 to the interior of the building. To this end, the back panel 222 may include an inlet to each unit within the building. The inlet may supply the clean air filtered by the ceramic chambers 212 to the unit within the building. The vertical side walls 218 may be inserted into the mounting pints 216 to stand upwardly between the vertical bars 210 on the edges and on the rails 214. Then, a cover 213 is placed on the vertical side walls 218 and then the horizontal mounting rail 224 may be placed in substantially 90 degrees angle with respect to the rails 214 on the vertical side walls 218. The horizontal mounting rails 224 may be used for installing the central section modules 111.

Figure 3A:
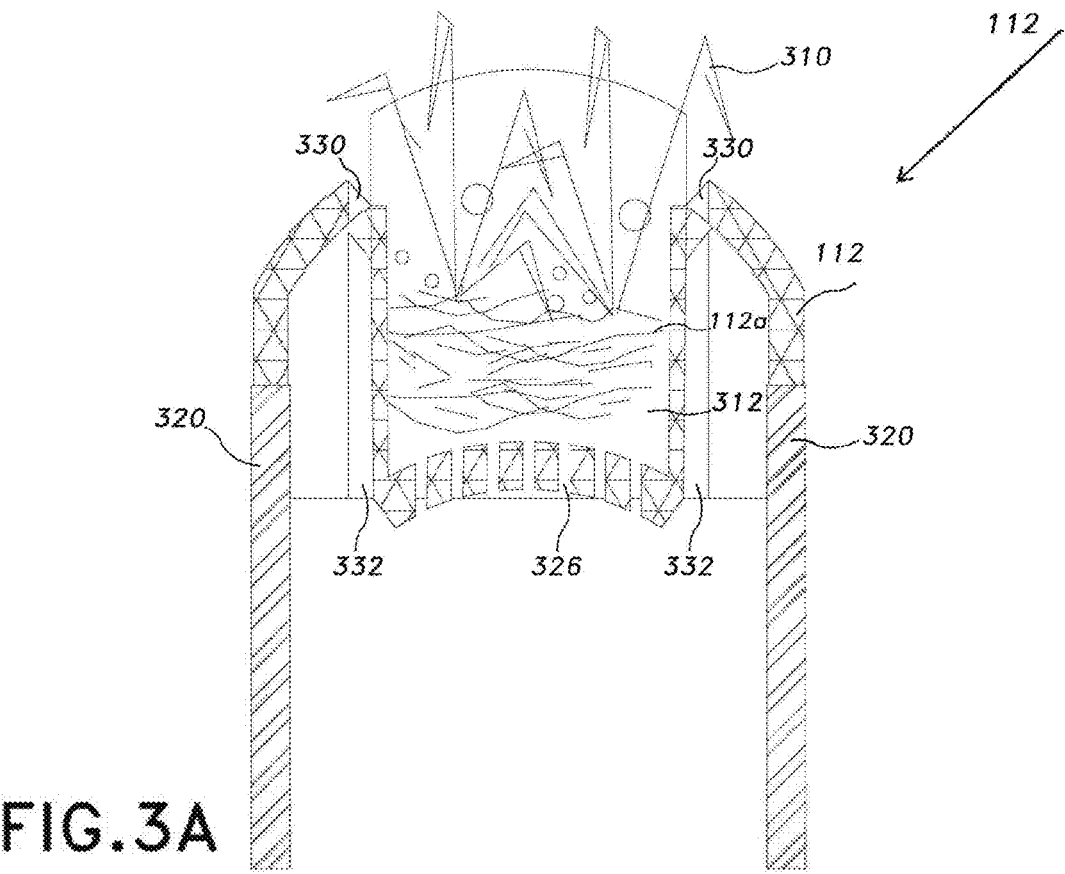
Figure 3B:
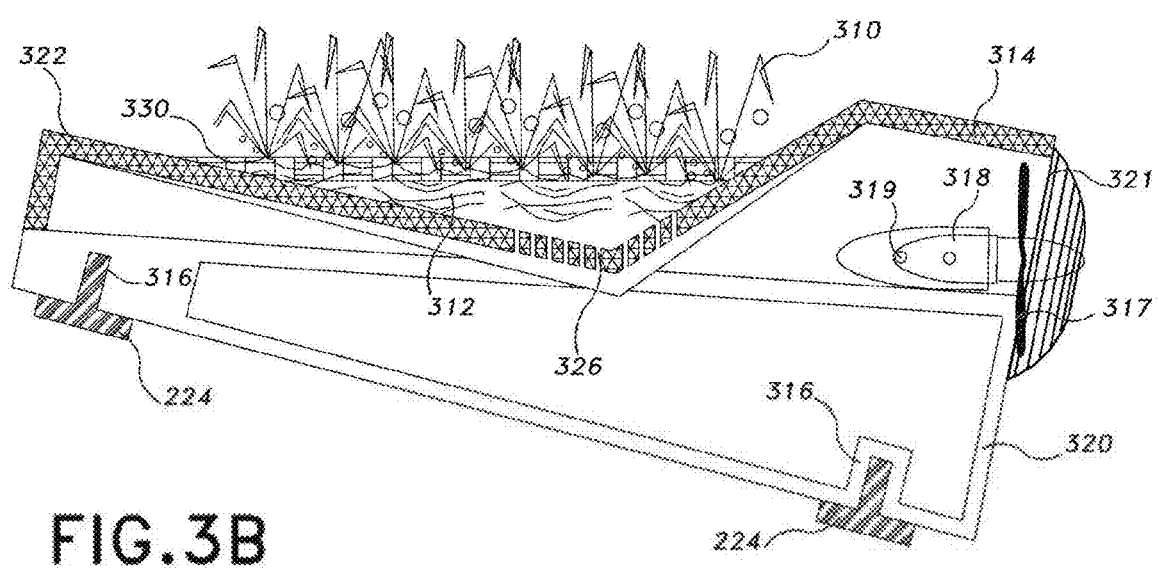
Figure 3C:
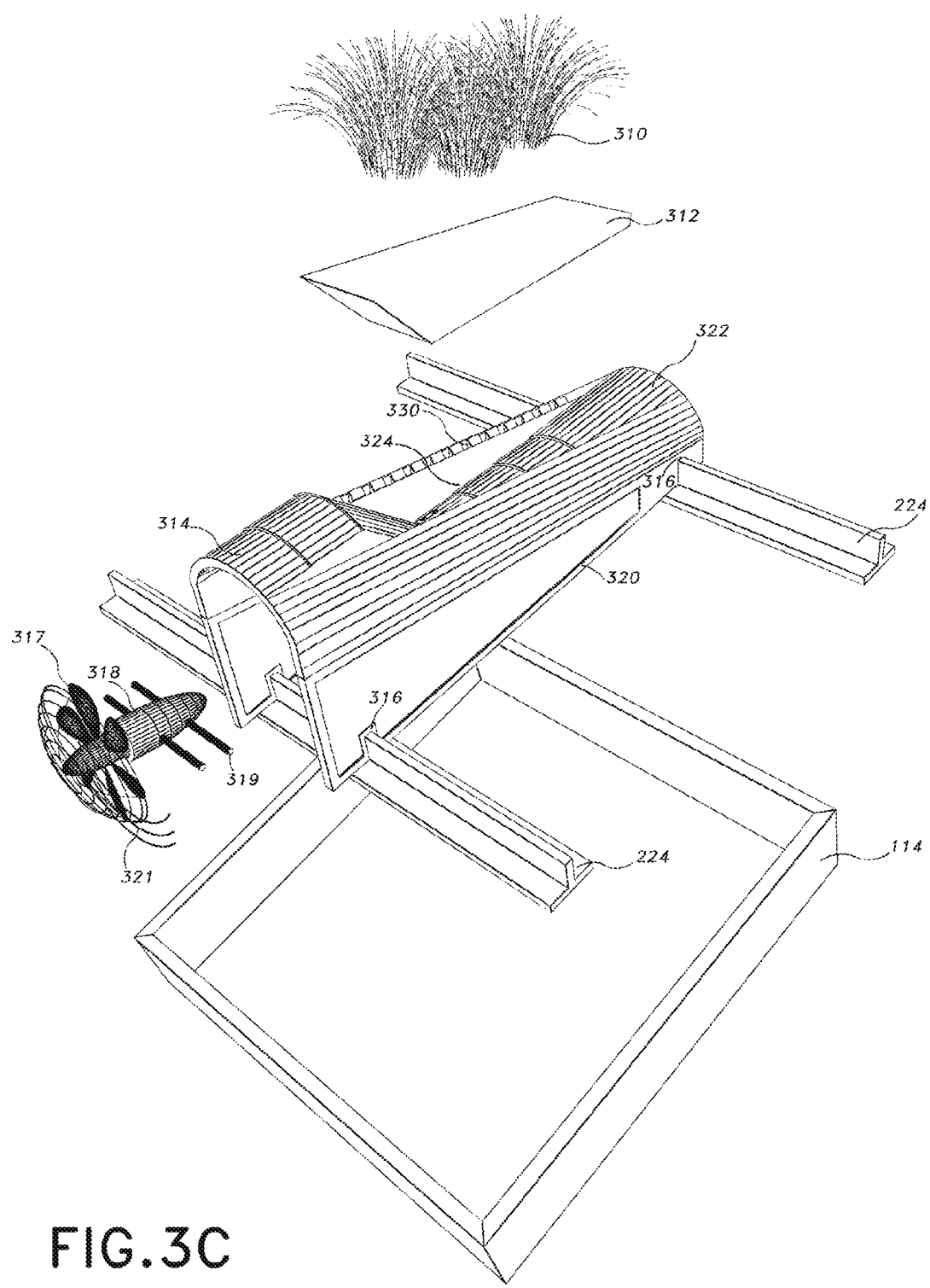

FIGS. 3A-3G illustrate various views of an exemplary central section module 111 of the roof system 100 shown in FIG. 1A. FIG. 3A is a front cutaway elevation view of a central section module 111. The module 111 includes the ceramic chamber 112, the planted area 112a, and the wind turbine 112b. FIG. 3B is a side cutaway view of a central section module 111. FIG. 3C is an exploded view of the central section module 111 installed on the mounting rails 224. The plants 310 are shown, growing from a planting soil 312. The central section module 111 includes the ceramic chamber 112 in the form of a domed ceramic shell 314 having notches 316 resting on horizontal mounting rails 222. A small wind turbine 112b is installed at a leading face of the domed ceramic shell 314, and includes wind-turbine blades 317, an electric generator 318, rails 319, and a fence 321. The electric generator 318 is configured to generate electricity as a result of the rotation of the blades 317 due to wind. The rails 319 may be configured for placing the small wind turbine 112b with the shell 314. The fence 321 may be configured to prevent solid material from entering the wind turbine and damaging the blades 317.

Figure 3D:
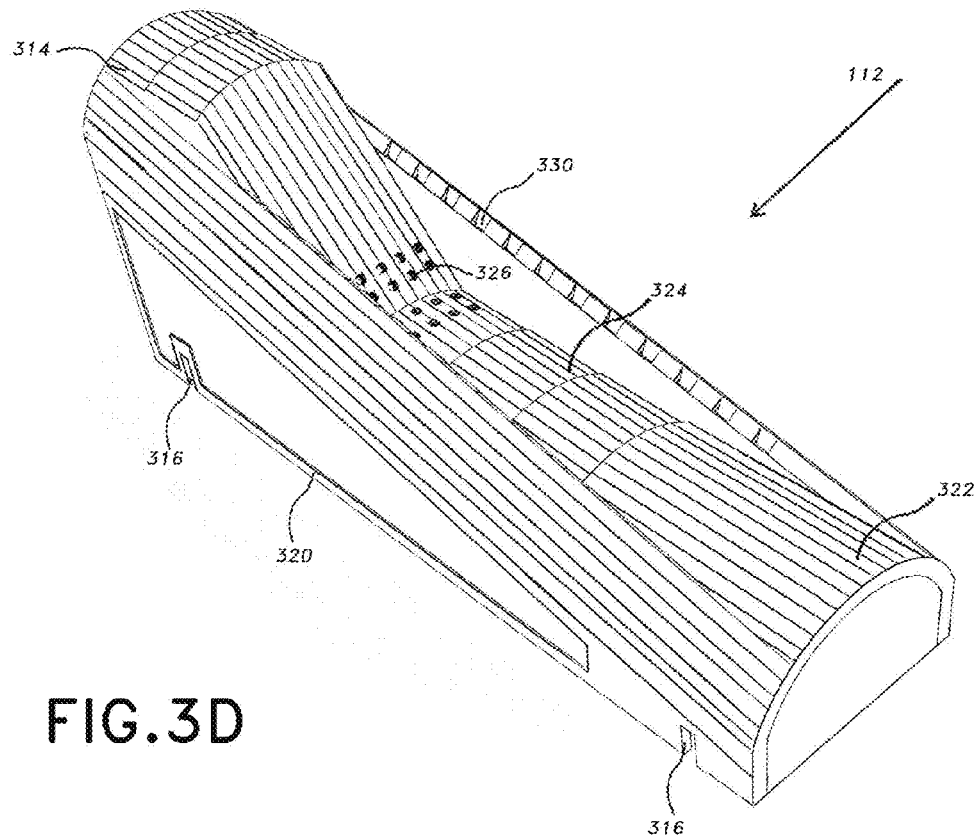
Figure 3E:
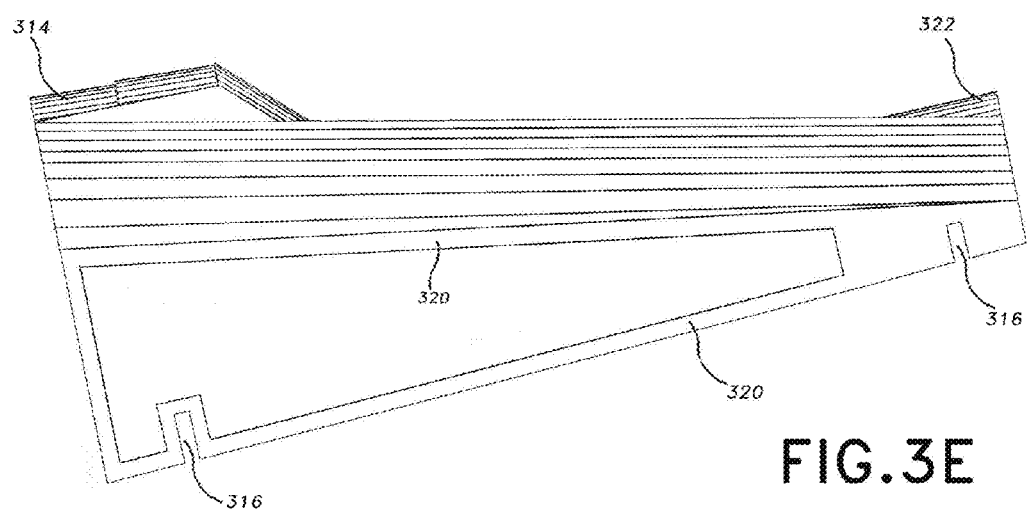

The tray 114 is shown for reference. FIG. 3D is a perspective view of a ceramic chamber 112. FIG. 3E is a side view of the ceramic chamber 112, which may have a triangular flat side surface 320, a curved top surface 322 and the notches 316. The triangular flat side surface 320 is configured to support the weight of the ceramic chamber 112 on the horizontal rails 224. A depression 324 is provided to retain the planting media. FIG. 3F is an end view of the ceramic chamber 112. FIG. 3G is a top view of the ceramic chamber. Water drain holes 326 passing through the depression 324 are shown. The ceramic chamber 112 also includes overflow drain holes 330. The overflow drain holes 330 are configured to reduce or prevent the possibility of the water overflowing from the depression 324. The overflow may happen due to heavy rain and in the scenario in which the rain accumulates in the depression 324 faster than leaving the depression 324 from the drain holes 326. In this scenario, the water level raises in the depression up until it reaches the level of the overflow drain holes 330 and then it transfers though channels 332 to beneath the ceramic chamber 112.

Figure 4A:
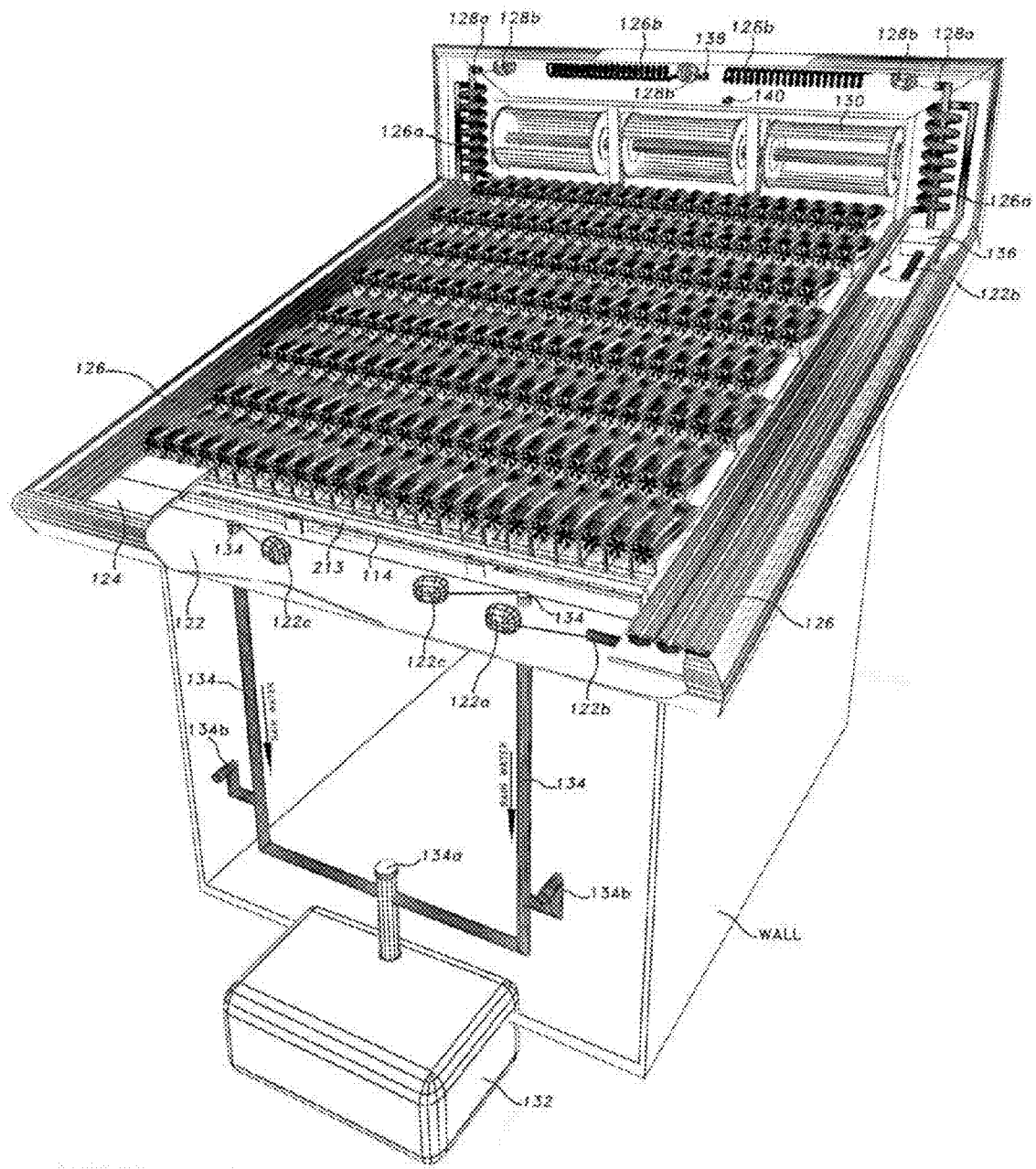
FIG. 4A illustrates various internal components of the roof system shown in FIG. 1A.

FIG. 4A illustrates various internal components of the roof system 100 shown in FIG. 1A. As shown and noted above, the preliminary water storage 122 forms a bottom front portion of the peripheral portion 120 and is positioned at a bottom portion of the tray 114. The preliminary water storage 122 is configured to preliminary store the filtered rain water before passing it to the other features of the roof system 100. The other features may include, for example, a solar water heater 126, a heated water storage 128, and a main water storage 132. The main storage 132 may be configured to store the rain water filtered via the plantation in the chamber 112 and any additional filter placed between the pipes in the chamber 112 and the water storage 132.

The preliminary water storage 122 includes a pump and a first threshold detector 122a. The first threshold detector 122a is coupled to the transfer tube 122b. The transfer tube 122b may be configured to transfer the water from the preliminary water storage 122 to the heated water storage 128. The transfer tube 122b may be configured to transfer the water via a pump to the heated water storage 128. Once the preliminary storage 122 is filled up to certain water level, the first threshold detector 122a is moved upward to close the entrance to the transfer tube 122b and prevent additional water from entering the tube 122b and subsequently the heated water storage 128.

The first threshold detector 122a may be a floating ball and may be configured to open or close a first aperture once an amount of water in the preliminary water storage 122 exceeds a first threshold. In keeping with the previous example, the first aperture may correspond to the entrance of the transfer tube 122b. The floating ball 122a may be configured to be in a first position in a natural state, leaving the entrance to the transfer tube 122b open. Once the water within the preliminary storage 122 reaches a certain level, the floating ball 122b may move from the first position to a second position, closing the entrance to the transfer tube 122b.

Figure 4B:
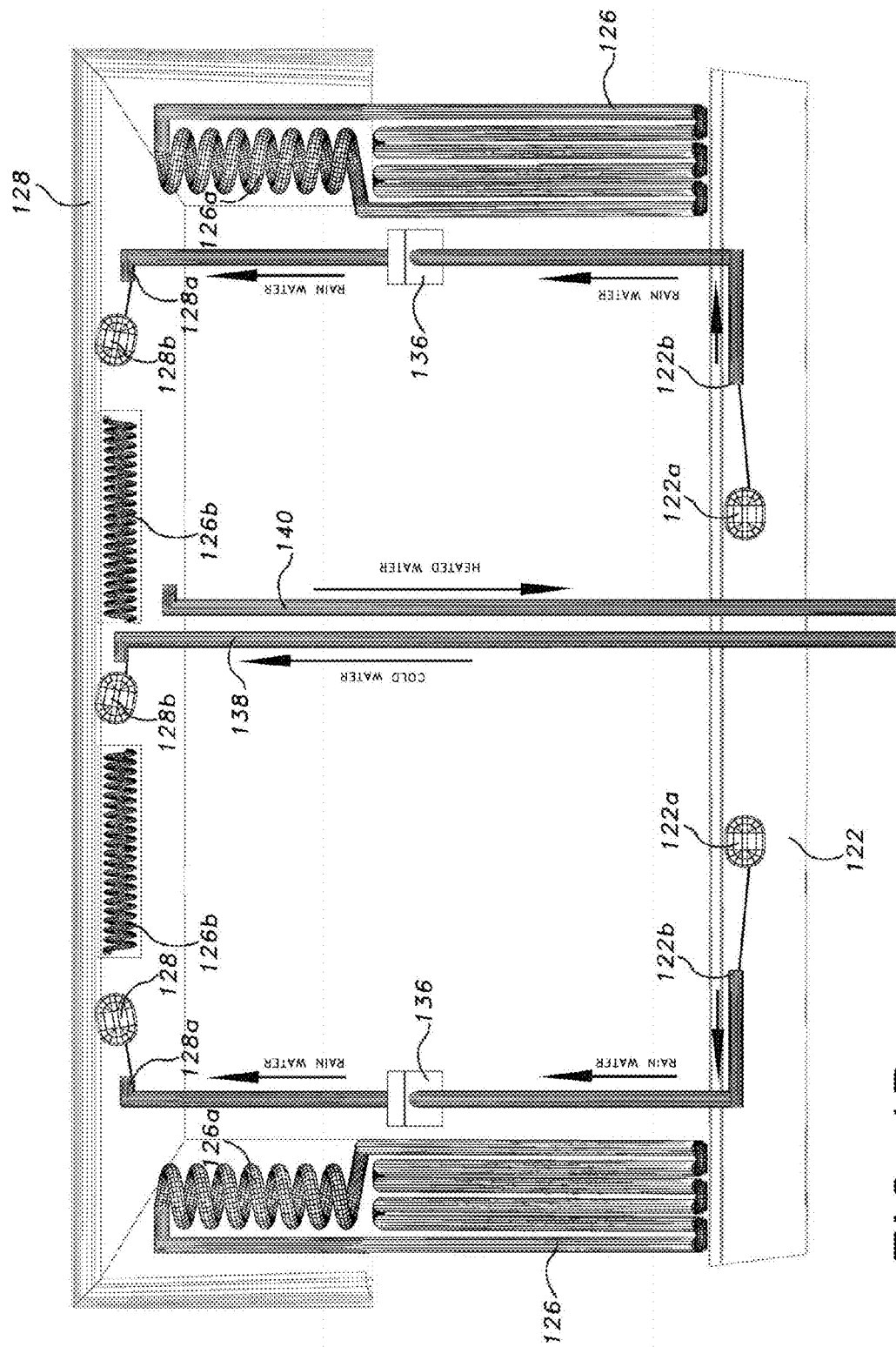
FIG. 4B illustrates a heated water flow system of the roof system shown in FIG. 1A.

The pump may be placed within the preliminary storage 122 or outside the preliminary storage 122. In one specific example, as shown in FIG. 4B, the pump 136 is placed outside the preliminary storage 122 on the transfer tube 122b and is configured to transfer the water from the preliminary water storage 122 and through the first aperture to a water heater storage 128. The transfer of the water from the preliminary water storage 122 to the water heater storage 128 may be stopped when the water heater storage 128 is filled or the water within the preliminary storage 128 reaches a certain threshold level.

The water heater storage 128 also includes a threshold detector 128b connected to the exit point 128a of the transfer tube 122b. The threshold detector 128b similar to the threshold detector 122a may be a floating ball and may be configured to open or close the exiting aperture 128a of the transfer tube 122b once an amount of water in the water heater storage 128 reaches a specific threshold. The floating ball 128b may be configured to be in a first position in a natural state, leaving the exit point 128a of the transfer tube 122b open. Once the water within the water heater storage 128 reaches a certain level, the floating ball 128b may move from the first position to a second position, closing the exit point 128a of the transfer tube 122b.

The preliminary water storage 122 also includes a second threshold detector 122c connected to a tube 134. The tube 134 couples the preliminary water storage 122 to the main water storage 132. The entrance of the tube 134 may be placed at a level latterly higher than the entrance of the tube 122b. To this end, the water from the preliminary water storage 122 is configured to first enter the tube 122b through to fill up the tank 128. Once the water heater storage 128 is filled or the water within the water heater storage 128 moves the floating ball 128a from its natural position to a position that would close the exit point 128b of the tube 122b, then the water within the preliminary water storage 122 also begins to rise. The rise of water will move the floating ball 122a from its natural position to a position that would close the entrance to the tube 122b. The water within the preliminary water storage 122 will then passes the entrance of the tube 122b and starts entering the tube 134 to fill up the main water storage 132. Once the main water storage 132 is filled up along with the tube 134, the water starts again to rise up within the preliminary water storage 122. As a result, the floating ball 128c moves upwardly to close the entrance to the tube 134.

The solar water heater 126 is configured to heat the water inside the heated water storage 128. The solar water heater 126 is placed on both sides of the heated water storage 128 and includes a plurality of tubes in a closed loop environment. Within the tubes, water and material preventing ice formation may be placed. The water may be heated up via absorption of solar energy and by the solar tubes and transfer the heat to the water placed in the heated water storage 128. The heated water storage 128 may be located on the forehead portion 131. The water enters from the preliminary water storage 122. Once the water level within the preliminary water storage 122 enters the entrance level of the tube 122b, it starts being pulled up via the pump 136 into the heated water storage tank 128. The tube 122b may be placed on both sides of the central portion 110. Alternatively, the tube 122b may be placed only on one side of the central portion 110. In either case, once the tank 128 is filled, the floating ball 122 closes the entrance to the tube 122b and as a result water level within the preliminary storage 122 continues to rise until it reaches the entrance of the tube 134 and then continues to fill up the main water storage 132. Once the main water storage 132 is filled up, the floating ball 122c closes the entrance to the tube 134. In the scenario, in which the main water storage 132 and the heated water storage 128 are both filled to their capacity, the water may be guided outside via the pipes 134b.

The main water storage 132 may be placed underground to keep water cool during summer and prevent water from icing during winter. The main water storage 132 may further include a filtering system configured to filter the water inside the water for drinking usage. The filtering system may be placed within the tube 134. The tube 134 may be configured to be opened and closed to clean and/or replace the filtering system. The exit pathway 134a may house a water turbine 134c (shown in FIG. 6A). The water turbine 134c may be configured to generate electricity from the water energy passing through the exit pathway 134a.

In the scenario, in which the rain water is not sufficient to fill up the heated water storage 128, additional water may be supplied to the heated water storage 128 from other sources. The additional water may be sourced from the city and may enter the heated water storage 128 via pipes 138. The heated water from the heated water storage 128 may then be transferred to the units within the building via pipes 140.

Figure 5A:
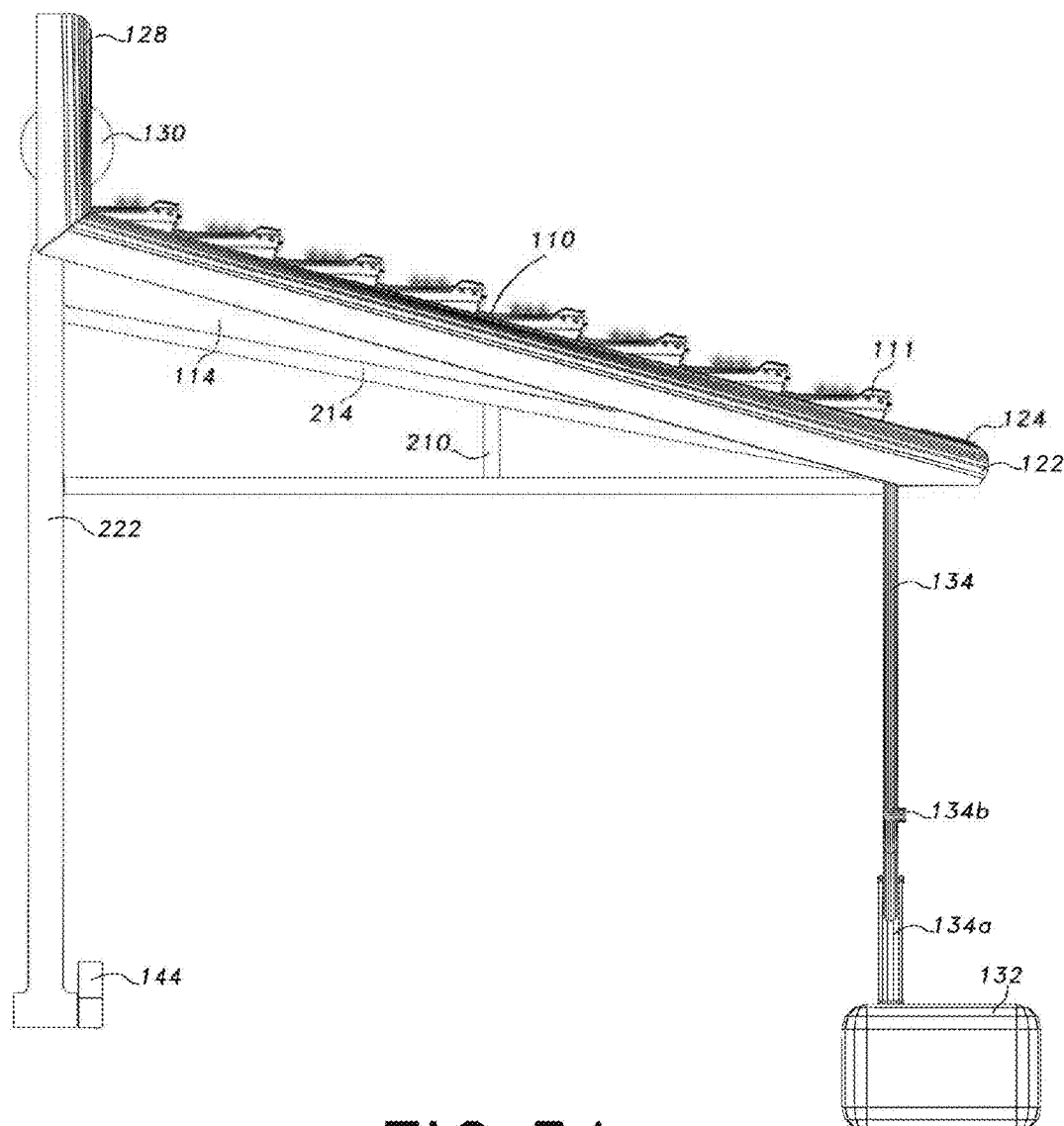
FIG. 5A illustrates a side view of the roof system shown in FIG. 1A.
Figure 5B:
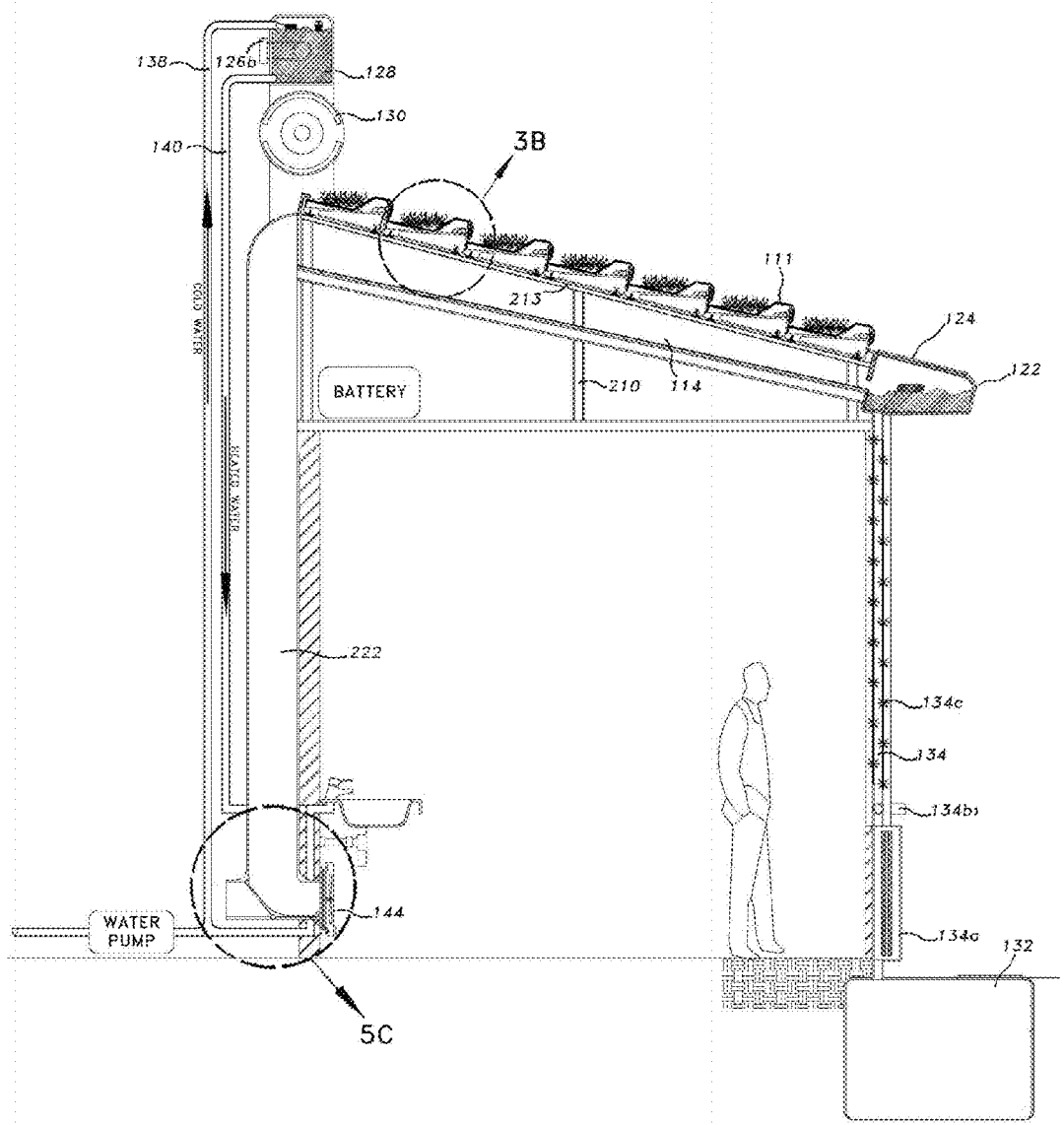
FIG. 5B illustrates cross sectional side view of the roof system shown in FIG. 1A across its length.

FIG. 5A is a side view of the roof system 100 shown in FIG. 1A. FIG. 5B is a cutaway perspective view of the roof system 100 shown in FIG. 1A. As shown, the ceramic chambers 112 within the central portions 111 are designed to attract the wind to their interior cavity. The wind attracted to the interior cavity of the ceramic chambers 112 passes through the planter area 112a of an adjacent ceramic chamber 112 and is thereby filtered before entering a common channel located under the plurality of ceramic chambers 112 and above the tray 114. The common channel may guide the wind to the back panel 222. The back panel 222 directs the wind toward the entrance 144.

Figure 5C:
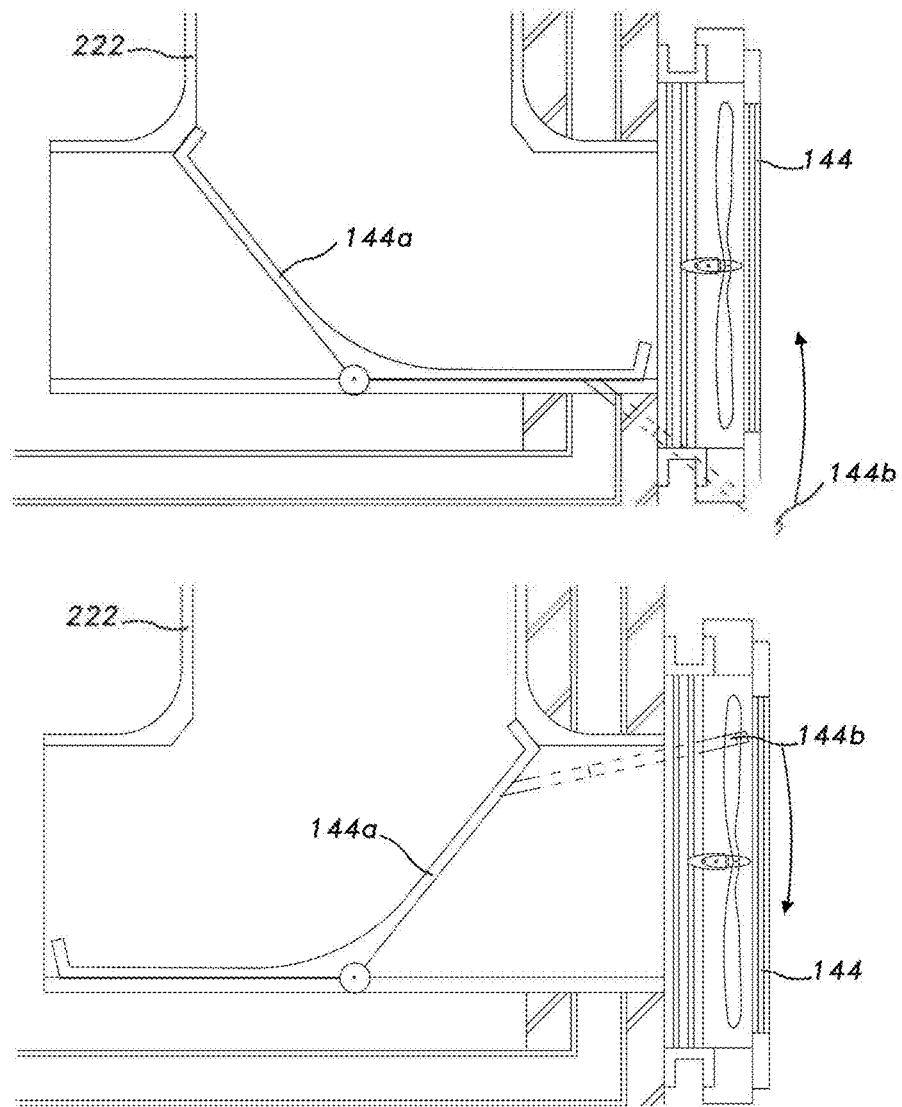
FIG. 5C illustrates an exemplary entrance for wind entering the roof system to the interior of the building.

FIG. 5C illustrates an exemplary entrance to the interior of the building for wind coming through the roof system 100 into the back panel 222. The entrance to the interior of the building includes a door 144a, a handle 144b, and a fan 145. The handle 144b is configured to change the position of the door 144a. When then handle 144b is down, the door 144a is in a first position providing a pathway for the wind from the back panel 222 to move toward the fan 145 and into the interior space of the building. When the handle 144b is up, the door 144b is in a second and different position from the first position preventing the wind from the back panel 222 to move toward the fan 145 and instead directing the wind to the exterior of the building. The fan 145 may rotate as a result of the wind passing through it. A heating element may be placed after the fan 145 to heat the wind passing through the fan 145 into the interior of the building.

The wind turbine 112b may be placed on the pathway of the wind entering the ceramic chambers 112. The wind turbine 112b may be configured to turn the wind energy to electricity. The wind turbine 112b may also be configured to further guide the wind inside the common channel placed under the plurality of ceramic chambers 112. The common channel may lead to a tunnel connected to the air ventilation of the building. To this end, clean air may be transferred from the common channel to the interior of the building.

Figure 6A:
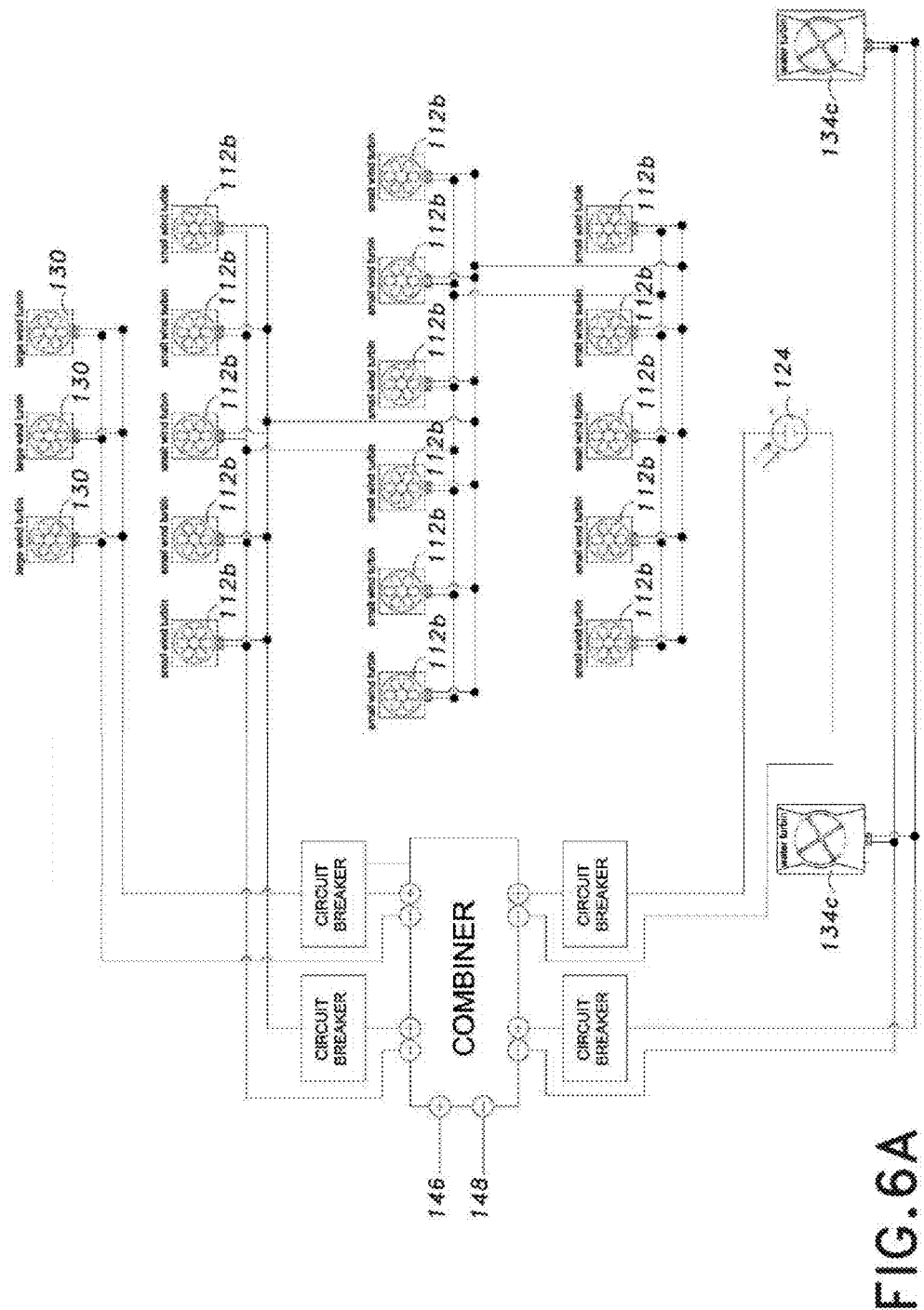
FIG. 6A illustrates an exemplary view of the electrical components of the roof system shown in FIG. 1A.

FIG. 6A illustrates an exemplary view of the electrical components of the roof system 100 shown in FIG. 1A. The electrical components includes large wind turbines 130, small wind turbines 112b, water turbine 134c, and solar panels 124. These electrical components were described above and therefore for the sake of brevity of description and clarity their redundant aspect is not further described. These electrical components are connected via a circuit breakers to a combiner. These electrical components may be controlled via a circuit breaker. The circuit breaker may connect these components to a combiner. The panels 124 may be any type of solar-to-electric type, including, for example, photovoltaic cells.

Figure 6B:
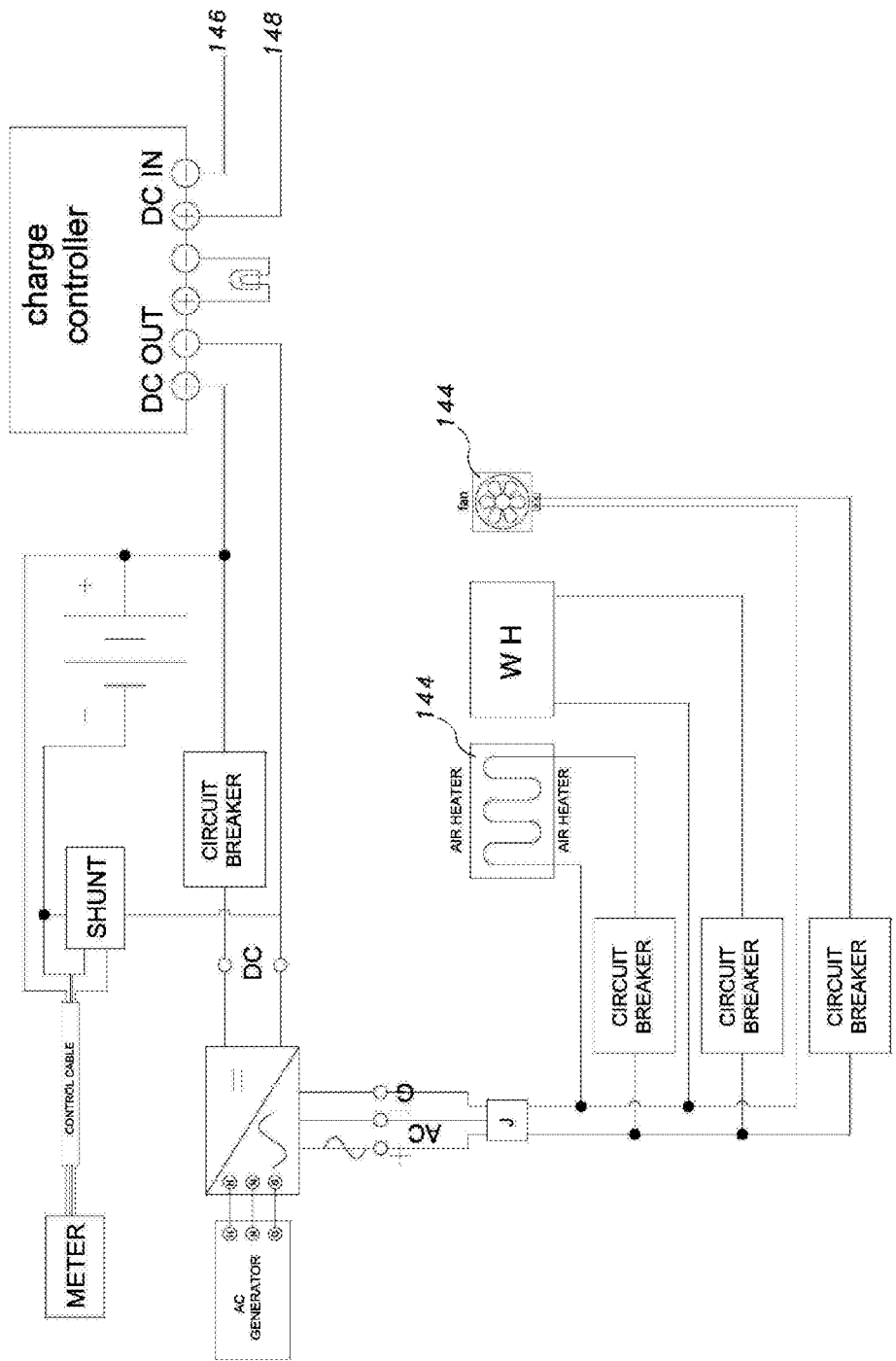
FIG. 6B illustrates another exemplary view of the electrical components of the roof system shown in FIG. 1A.

FIG. 6B illustrates another exemplary view of the electrical components of the roof system 100 shown in FIG. 1A. FIG. 6B is an extension of FIG. 6A. To this end, it shows that a charge controller may be placed after the combiner. The charge controller may be used to reduce the decay speed of the battery. For changing the DC energy to AC, an inverter may be used. The inverter may be controlled via a circuit breaker. In one implementation, when the battery is at or below a threshold, the electricity from the power grid may be used to charge the battery. Alternatively, the power grid may directly provide power to the system 100 and supplement the shortage of the power in the battery. The AC power from the inverter may be supplied to the heating elements for heating the water and air within the system 100.

Other implementations are contemplated. While the description above refers to the ceramic chambers 112 as being ceramic, the chambers 112 may be constructed of other suitable materials. While the wind turbines 112b in the central portion 110 are referred to a small turbines and the wind turbines 130 in the peripheral portion 120 are referred to as large turbines, this is for convenience and description of an implementation only, and the turbines 112b and 130 may each be of any relative size, and may also each have any configuration of blades.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and may be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, should may they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A roofing system comprising:
   a preliminary water storage;
   a tray configured to cover a roof of a building and direct water incident thereon to the preliminary water storage;
   a central portion having a plurality of modules, each module having a respective chamber element and a first wind turbine housed inside each respective chamber element, and each chamber element forming a planting area on top of the chamber element; and
   a support structure supporting the modules in adjacent rows, with each row at a different elevation from an adjacent row, wherein,
   each module is configured to receive rain water, filter the received rain water, and transfer the filtered rain water to the tray for passing to the preliminary water storage; and
   the first wind turbine is configured to convert a wind energy into electrical energy.

2. The roofing system according to claim 1, wherein each chamber element is an elongated structure having an inlet, and each wind turbine is located at the inlet.

3. The roofing system of claim 2, wherein each chamber element has a top surface that defines the planter area of the chamber element, each planter area configured to support plant life.

4. The roofing system of claim 3, further comprising:
   a plurality of columns extended to form legs of the roofing system;
   a plurality of vertical walls disposed between the legs of the roofing system; and
   a plurality of horizontal bars that support respective rows of chamber elements and the tray.

5. The roofing system of claim 4, wherein:
   the plurality of chamber elements are configured to cover a portion of a space between the plurality of horizontal bars such that when rain falls on the roofing system the rain contacts the plurality of chamber elements and passes through the plurality of chamber elements before entering the tray,
   each of the plurality of chamber elements is configured to attract the wind and guide the wind to an interior housing of the chamber element, and
   each first turbine is disposed at the inlet of a respective chamber element in a path of the wind and includes a generator configured to turn the wind energy into the electrical energy, and
   the generator is disposed in an interior region of the chamber element.

6. The roofing system of claim 5, wherein:
   the plurality of chamber elements are arranged in at least three rows, and each row includes a plurality of chamber elements positioned between two bars selected from the plurality of horizontal bars, the system further comprising:
   an upright forehead portion; and
   at least one second wind turbine disposed in the upright forehead portion.

7. The roofing system of claim 5, further comprising:
   a water exit pathway in fluid communication with the tray; and
   a water turbine located in the water exit pathway at an elevation lower than the tray, and the water turbine configured to generate electricity from water energy passing through the exit pathway.

8. The roofing system of claim 7, further comprising: a filter located in the water exit pathway configured to filter the water passing through the exit pathway.

9. The roofing system of claim 5, further comprising: a wind pathway located between the tray and the plurality of chambers, configured to direct filtered wind to an interior of a building.

10. The roofing system of claim 2, wherein the tray is adapted to receive rain water from all the chamber elements, wherein each chamber element has drain holes located in the planter area.

11. The roofing system of claim 1, further comprising: a solar panel located in front of the central portion and configured to convert solar energy to electricity.

12. The roofing system of claim 1, further comprising:
   a peripheral portion disposed at least adjacent and along two sides of the central portion;
   water heating tubes and water transfer tubes disposed in the peripheral portion; and
   a water transfer system configured to collect water from the chamber elements and direct the water through the water transfer tubes.

13. The roofing system of claim 12, further comprising: an intermediate water storage disposed between the chamber elements and the water heating tubes.

14. The roofing system of claim 13, further comprising: the tray is disposed in between the chamber elements and the intermediate water storage.

15. The roofing system of claim 1, wherein the chamber elements are made of ceramic material.

16. The roofing system of claim 1, wherein the chamber elements each have a top region which has a domed shape.

17. The roofing system of claim 1, wherein each chamber element has a top surface that defines the planter area of the chamber element, and defines drain holes in the planter area of the chamber element, each planter area configured to support plant life.

18. The roofing system of claim 17, further comprising: the tray is adapted to receive rain water from all the chamber elements, wherein water passing through the drain holes of each chamber element enters the tray.

19. A roofing system comprising:
   a first region having a plurality of first airflow chamber elements, arranged in parallel rows with each row at a different height than an adjacent row;
   a respective first wind turbine disposed in each airflow chamber element;
   a planter area defined on an upper portion of each airflow chamber element;
   at least one drain hole disposed in the planter area;
   a water collection tray disposed underneath the first region; and
   a second region having water heating tubes that receive water from the water collection tray.

20. A roofing system according to claim 19, further comprising at least one of: a third region having at least one second wind turbine and a fourth region having a solar panel.

* * * * *